(12) United States Patent
Grover

(10) Patent No.: US 10,284,242 B2
(45) Date of Patent: May 7, 2019

(54) CUSTOM BROADCAST AUDIO CONTENT STATION

(71) Applicant: Myine Electronics, Inc., Ferndale, MI (US)

(72) Inventor: Joey Ray Grover, Madison Heights, MI (US)

(73) Assignee: Livio, Inc., Royal Oak, MI (US)

(*) Notice: Subject to any disclaimer, the term of this patent is extended or adjusted under 35 U.S.C. 154(b) by 940 days.

(21) Appl. No.: 14/326,703

(22) Filed: Jul. 9, 2014

(65) Prior Publication Data

US 2016/0013823 A1    Jan. 14, 2016

(51) Int. Cl.
*H04B 1/16* (2006.01)
*H04H 40/18* (2008.01)
(Continued)

(52) U.S. Cl.
CPC ............ *H04B 1/16* (2013.01); *H04H 40/18* (2013.01); *H04H 60/46* (2013.01); *H04H 60/74* (2013.01)

(58) Field of Classification Search
CPC . G06F 17/00; G06F 7/00; G06F 17/30; G06F 17/30581; G06F 17/30174;
(Continued)

(56) References Cited

U.S. PATENT DOCUMENTS 7,076,561 B1    7/2006   Rosenberg et al.
8,229,888 B1 *  7/2012   Roskind ........... H04N 21/25808
                                                 707/611
(Continued)

FOREIGN PATENT DOCUMENTS

CN        1640117 A      7/2005
CN      101197930 A      6/2008
(Continued)

OTHER PUBLICATIONS

Evolver; 2011; "Grooveshark", http://evolver.fm/appdb/app/grooveshart.
(Continued)

*Primary Examiner* — Pablo N Tran
(74) *Attorney, Agent, or Firm* — Frank L. Lollo; Brooks Kushman P.C.

(57) ABSTRACT

A system may be configured to scan audio content providers, using at least one receiver, to identify metadata of audio content instances currently being broadcast by the audio content providers, capture audio content instances from the audio content providers, using the at least one receiver, when the metadata of the audio content instances matches desired content information, and add the captured audio content instances to a customized content queue of desired audio content. The system may also be configured to provide, to a content categorization server, user content preferences indicative of properties of audio content instances preferred by a user, receive, from the content categorization server, desired content information indicative of metadata of audio content instances preferred for experiencing by a user based on the user content preferences, and identify audio content instances broadcast from audio content providers as preferred based on the desired content information.

10 Claims, 5 Drawing Sheets

(51) Int. Cl.
*H04H 60/46* (2008.01)
*H04H 60/74* (2008.01)

(58) Field of Classification Search
CPC .. G06F 11/1451; G06F 11/1464; H04L 29/08; H04L 67/1095; H04L 67/1097; H04L 67/18; H04L 29/0854
See application file for complete search history.

(56) References Cited

U.S. PATENT DOCUMENTS

| | | | |
|---|---|---|---|
| 9,262,435 B2* | 2/2016 | Vibhor | ................ H04L 29/0854 |
| 2003/0067554 A1 | 4/2003 | Klarfeld et al. | |
| 2009/0164473 A1 | 6/2009 | Bauer | |
| 2010/0125563 A1* | 5/2010 | Nair | ........................ G06Q 30/02 707/709 |
| 2013/0311036 A1 | 11/2013 | Liu et al. | |

FOREIGN PATENT DOCUMENTS

| CN | 101303878 A | 11/2008 |
|---|---|---|
| CN | 102148857 A | 8/2011 |
| CN | 102222080 A | 10/2011 |

OTHER PUBLICATIONS

Banshee; Jun. 5, 2008, http://banshee.fm/download/archives/1.0.0.
Automotive Culture and New Technologies (Pinyin: Qi Che Wen Hua Yu Xin Ji Shu).

* cited by examiner

US 10,284,242 B2

CUSTOM BROADCAST AUDIO CONTENT STATION

TECHNICAL FIELD

This disclosure generally relates to creation of a custom audio content station from broadcast sources of audio content.

BACKGROUND

A vehicle may receive audio content using various types of receiver. For example, the vehicle may include an AM radio receiver, an FM/HD radio receiver, and a satellite radio receiver. These broadcast receivers may be configured to tune to one of multiple broadcast stations that provide audio content in a specified genre or format. A driver of a vehicle may select a receiver and a broadcast station to receive content of the desired genre or format.

SUMMARY

In an first illustrative embodiment, a system includes a vehicle processor configured to scan audio content providers, using at least one receiver, to identify metadata of audio content instances currently being broadcast by the audio content providers, capture audio content instances from the audio content providers, using the at least one receiver, when the metadata of the audio content instances matches desired content information, and add the captured audio content instances to a customized content queue of desired audio content.

In a second illustrative embodiment, a vehicle processor configured to provide, to a content categorization server, user content preferences indicative of properties of audio content instances preferred by a user, receive, from the content categorization server, desired content information indicative of metadata of audio content instances preferred for experiencing by a user based on the user content preferences, and identify audio content instances broadcast from audio content providers as preferred based on the desired content information.

In a third illustrative embodiment, a system includes a vehicle processor configured to receive a request to play audio content instances from a customized content queue, the customized content queue including captured audio content instances broadcast from the audio content providers and that match desired content information, when the queue includes audio content, remove and play an instance of audio content from the customized content queue, and otherwise, tune to a live audio content provider.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Broadcast stations, such as AM, FM, or HD radio stations, may become repetitive or may not consistently play audio content that a user would like. A user may also be challenged to find a single station to enjoy, and may instead flip among a set of stations (e.g., using station presents) looking for suitable programming. While many users listen to broadcast audio content, it may be frustrating for a user to switch stations to avoid listening to content that the user does not enjoy.

An improved broadcast listening system may be configured to create a customized audio channel for a user by scanning and time-shifting broadcast audio content. Using initial information such as a genre of music, an artist, or a song title as a seed, the service may be configured to query a content matching service (such as the Music Genome Project®) for a listing of related audio content. The system may scan available broadcast stations, and if the system finds audio content that matches the listing of related audio content, the system may record that content into a customized content queue. In some cases, the system may utilize multiple content receivers to concurrently scan and record available broadcast stations. If no currently recorded songs are available in the queue for listening, the system may tune to a station live (preferably to a station currently playing content from the list or of a station likely to be providing suitable content), while another content receiver of the system may be used to scan for and record matching content. As the system may utilize broadcast audio content as source material, a customized audio content station may be implemented using existing audio content sources of the vehicle.

Figure 1:
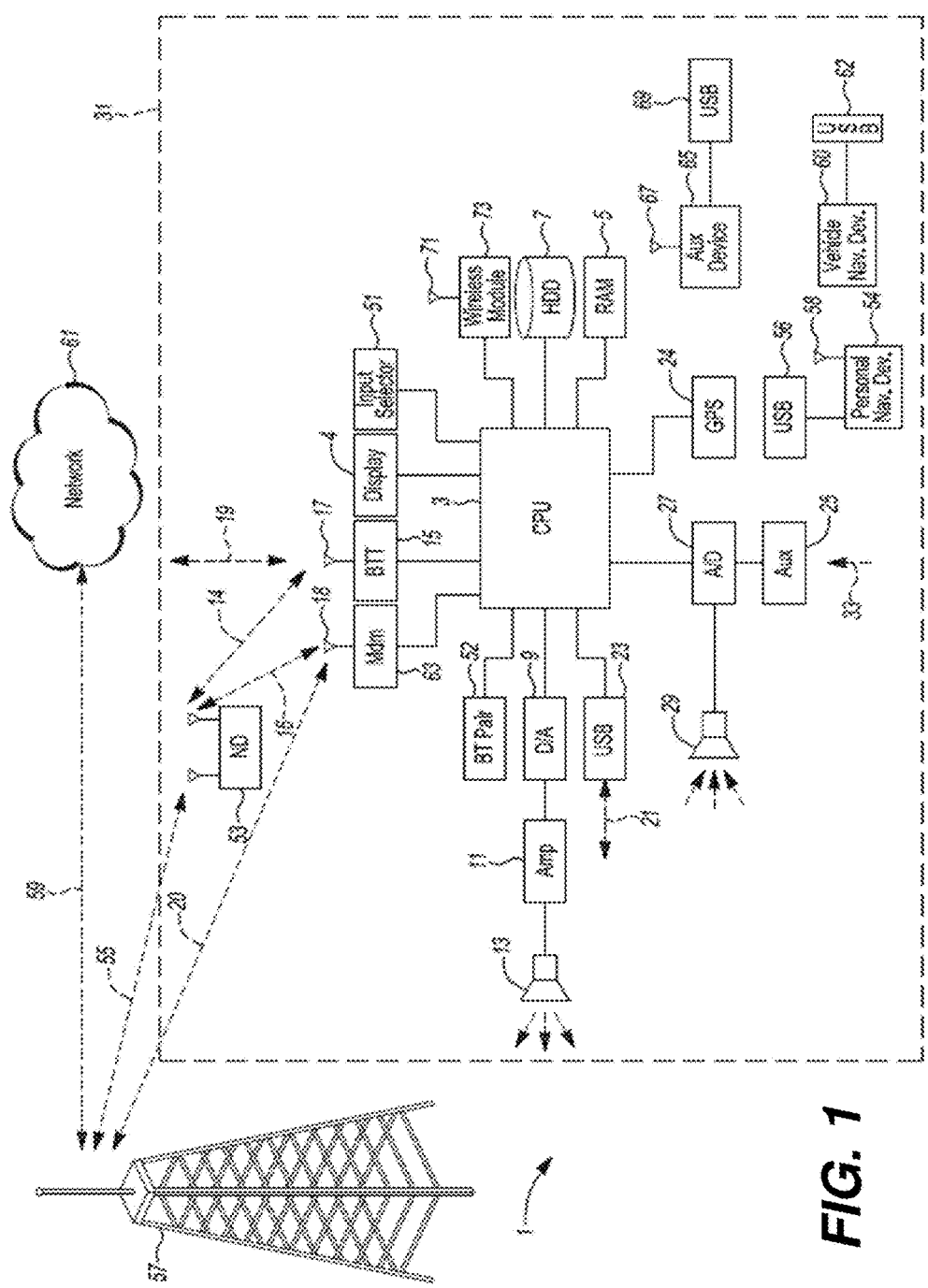
FIG. 1 is an exemplary block topology of a vehicle infotainment system implementing a user-interactive vehicle based computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection.

Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

Figure 2:
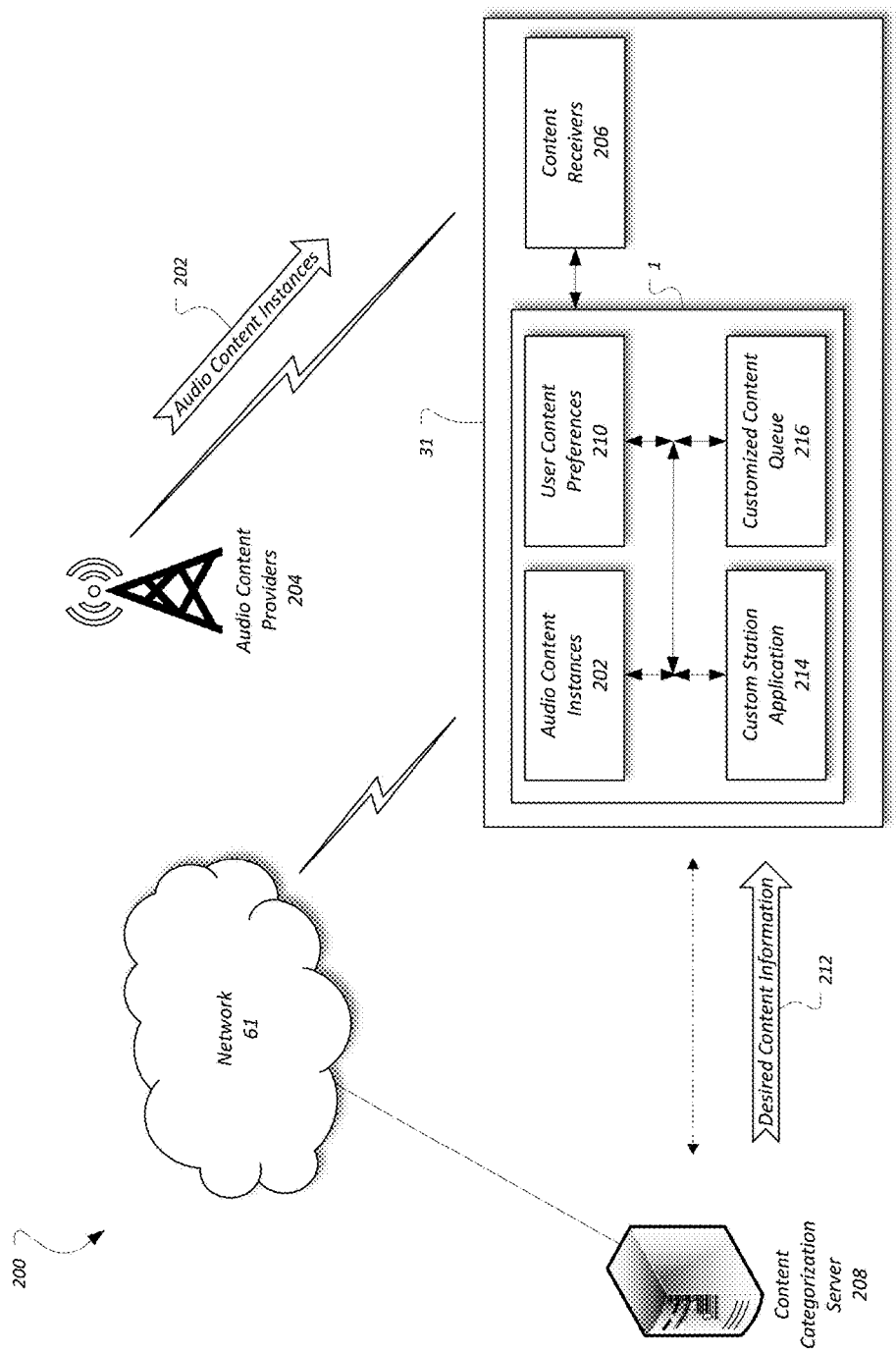
FIG. 2 illustrates an exemplary system for creation of a customized content queue of audio content using a custom station application of a vehicle.

FIG. 2 illustrates an exemplary system 200 for creation of a customized content queue 216 of audio content 202 using a custom station application 214 of a vehicle 31. As illustrated, the system 200 includes audio content providers 204 configured to broadcast audio content 202. The system 200 further includes one or more content receivers 206 of the vehicle 31 configured to receive the audio content 202 from the audio content providers 204. The system 200 further includes a content categorization server 208 in communication with the VCS 1 via a data connection over the network 61, and configured to provide desired content information 212 to the VCS 1. The system also includes the custom station application 214 installed to the vehicle 31 and configured to request the desired content information 212 from the content categorization server 208 based on the user content preferences 210, and direct the content receivers 206 to capture the audio content 202 according to user content preferences 210 to create the customized content queue 216. It should be noted that the illustrated system 200 is merely exemplary, and more, fewer, and/or differently located elements may be used. As an example, the user content preferences 210 may be stored to and retrieved from the user's paired nomadic device 53, instead of or in addition to being stored by the VCS 1.

An audio content instance 202 may refer to a program, episode, song, performance, or any other digital or analog audio content. In many cases, the audio content instance 202 may further be associated with metadata descriptive of the content of the audio content instance 202, such as program name, song name, album name, artist name, year of production, and composer, as some examples.

The audio content providers 204 may be configured to maintain the audio content instances 202, and to distribute the audio content instances 202 to be received and experienced by users. Exemplary audio content providers 204 may include over-the-air broadcast radio systems, satellite radio broadcast systems, and Internet-protocol based audio systems that provide streaming content over the network 61. The network 61 may include one or more interconnected communication networks such as the Internet, a cable television distribution network, a satellite link network, a local area network, a wide area networks, and a telephone network, as some non-limiting examples.

The audio content providers 204 may be further configured to provide metadata descriptive of the audio content instances 202 being broadcast. As an example, an FM radio audio content provider 204 may be configured to provide a radio data system (RDS) data stream accompanying the broadcast, which may include metadata such as artist, title, and genre. As another example, a satellite radio audio content provider 204 may provide information such as category, channel name, channel number, artist and song name along with the audio content instances 202. As a further example, the vehicle 31 may be configured to use different types of content receivers 206 to retrieve the audio content instances 202 and the metadata. For instance, the vehicle 31 may retrieve the metadata from an Internet service and the audio content instance 202 from an over-the-air broadcast.

The content receivers 206 may include various types of device configured to receive and decode audio content instances 202 obtained from the audio content providers 204. As one possibility, the content receivers 206 may include radio tuners configured to receive and decode audio content instances 202 provided by the content receivers 206. As another possibility, the content receivers 206 may include network interfaces configured to receive and decode streaming content encoded for network transport.

In some cases, the vehicle 31 may include multiple content receivers 206. For example, the vehicle 31 may include a content receiver 206 configured to tune to an FM radio station and receive audio content instances 202 provided from an FM radio audio content provider 204, a content receiver 206 configured to tune to an AM radio station and receive audio content instances 202 provided from an AM radio audio content provider 204, and a content receiver 206 configured to tune to a satellite radio station and receive audio content instances 202 provided from a satellite radio audio content provider 204. As another example, the vehicle may include multiple content receivers 206 of the same type, such as multiple independently-tunable FM radio content receivers 206.

The content categorization server 208 may be configured to maintain a data store of associations of audio content instances 202 with other audio content instances 202 sharing similar properties. The data store may define one or more content categories (such as pop, rock, hip-hop, electronica, jazz, world music, classical, talk, religious music, etc.). Within each content category, the data store may further define a set of category parameters defining the properties of the audio content instances 202 within that category (such as type of melody, type of harmony, type of rhythm, overall musical form and instrumentation used). Each audio content instance 202 in the data store may be identified according to metadata (e.g., song name and artist), assigned to a content category, and further assigned a value for each parameter of the assigned category.

Using the data store, the content categorization server 208 may be configured to receive queries including metadata of audio content instances 202 (e.g., song name, artist name, etc.) or parameters of desired audio content instance 202. Responsive to the queries, the content categorization server 208 may be configured to provide a listing of metadata of similar audio content instances 202. To identify audio content instances 202 similar to a given audio content instance 202 (or to given parameters), the content categorization server 208 may compare the parameters of the other audio content instances 202 in the same category with the parameter values of the given audio content instance 202 (or to the given parameters), such that audio content instance 202 assigned parameter values that are most similar to those of the given audio content instances 202 (or parameters) are determined to be the most similar audio content instances 202. The desired audio content instance 202 parameters may be referred to as user content preferences 210. The metadata of similar audio content instances 202 may be referred to as desired content information 212.

The custom station application 214 may be configured to receive the user content preferences 210, and query the content categorization server 208 for desired content information 212 according to the user content preferences 210. Using the desired content information 212, the custom station application 214 may be configured to direct the content receivers 206 to scan for audio content instances 202 that match the desired content information 212, and record any such audio content instances 202 that are found. The set of recorded audio content instances 202 may be referred to as the customized content queue 216. The customized content queue 216 may be played back by the custom station application 214, thereby using recorded broadcast audio content instances 202 to form a custom station conforming to the user content preferences 210. Further details of the operation of the custom station application 214 are discussed in detail below with respect to FIGS. 2-7.

Figure 3:
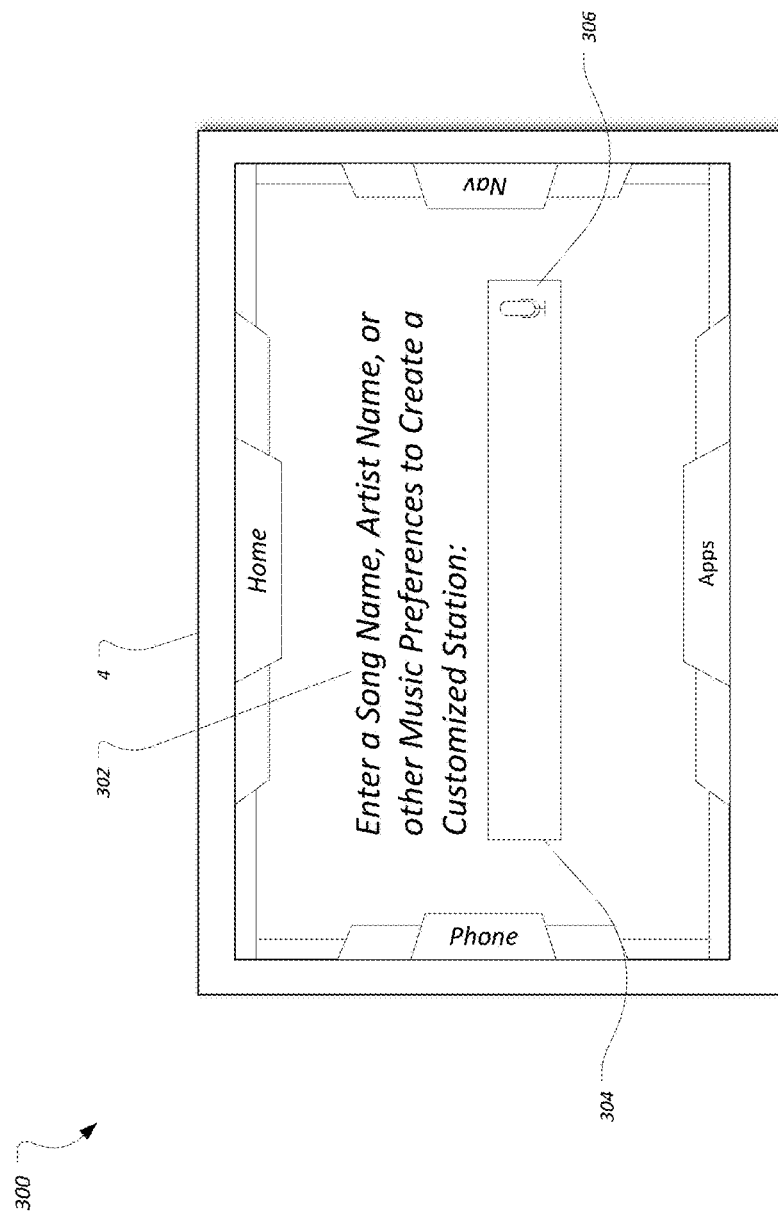
FIG. 3 illustrates an exemplary user interface of the custom station application for receiving the user content preferences.

FIG. 3 illustrates an exemplary user interface 300 of the custom station application 214 for receiving the user content preferences 210. The custom station application 214 may be configured to provide the user interface 300 to the user using the display features of the VCS 1, e.g., via the display 4. The user interface 300 may include a label 302 to indicate to the user that the user interface 300 is for receiving the user content preferences 210. The user interface 300 may further include a preferences input control 304 configured to receive metadata regarding audio content instances 202 (e.g., song title, artist name, type of melody, type of harmony, type of rhythm, etc.) to use to form the user content preferences 210. In some cases, the vehicle 31 HMI may support voice command selection, and the preferences input control 304 may be associated with a voice input indication 306 configured to indicate to the user that voice input is allowable. For example, to invoke voice input into the preferences input control 304, the user may press a push-to-talk button within the vehicle 31, and may speak audio content instance 202 metadata (e.g., song name, artist name, etc.) or other parameters (e.g., type of melody, type of harmony, type of rhythm) to form the user content preferences 210.

Figure 4:
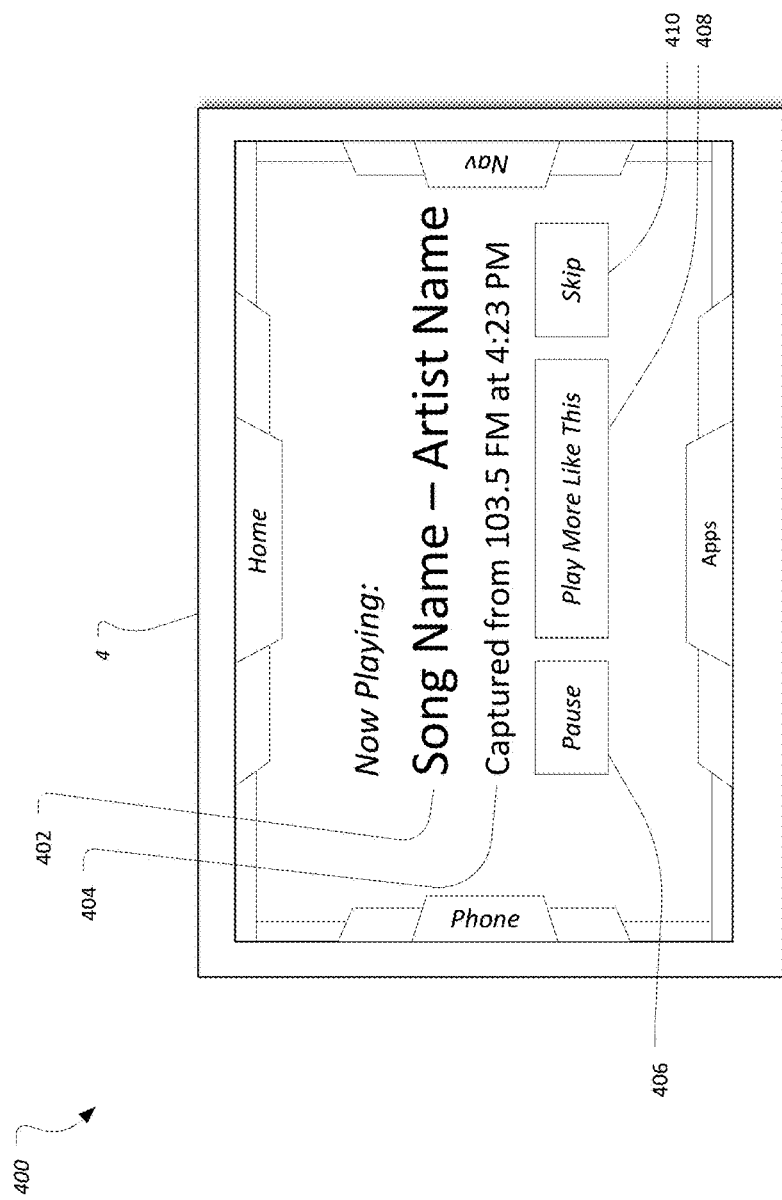
FIG. 4 illustrates an exemplary user interface of the custom station application for playing content from the customized content queue.

FIG. 4 illustrates an exemplary user interface 400 of the custom station application 214 for playing content from the customized content queue 216. As with the user interface 300, the user interface 300 may be presented in the display 4 of the vehicle 31. The user interface 400 may be provided, for example, responsive to receipt of a command from the user requesting that the custom station application 214 provide audio content from the customized content queue 216. As illustrated, the user interface 400 includes metadata information fields 402 configured to display information with respect to the currently played audio content instance 202 from the customized content queue 216 being provided to the user. The user interface 400 may further include broadcast information fields 404 configured to display information such as when (e.g., date/time) and from what audio content provider 204 (e.g., which radio station) the audio content instance 202 was captured.

The user interface 400 may also include additional controls configured to allow for control of playback of content from the customized content queue 216. As an example, the user interface 400 may include a pause control 406 that, when selected, is configured to pause playback of the currently played audio content instance 202 (or if a live broadcast, pause the playback by buffering the content). As another example, the user interface 400 may include a more-like-this control 408 that, when selected, is configured to update the user content preferences 210 for the user to indicate the metadata or other parameters of the currently played audio content instance 202 should replace or be weighted more heavily in the identification of desired content information 212 for audio content instances 202. The user interfaced 400 may also include a skip control 410 that, when selected, is configured to move playback to the beginning of the next audio content instance 202 of the customized content queue 216. In some cases, to skip an audio content instance 202 may further update the user content preferences 210 for the user to indicate the metadata or other parameters of the currently played audio content instance 202 should be weighted less heavily in the identification of desired content information 212 for audio content instances 202, or may even prevent the current audio content instance 202 from being recorded again or played in the future.

Figures 5, 6, 7:
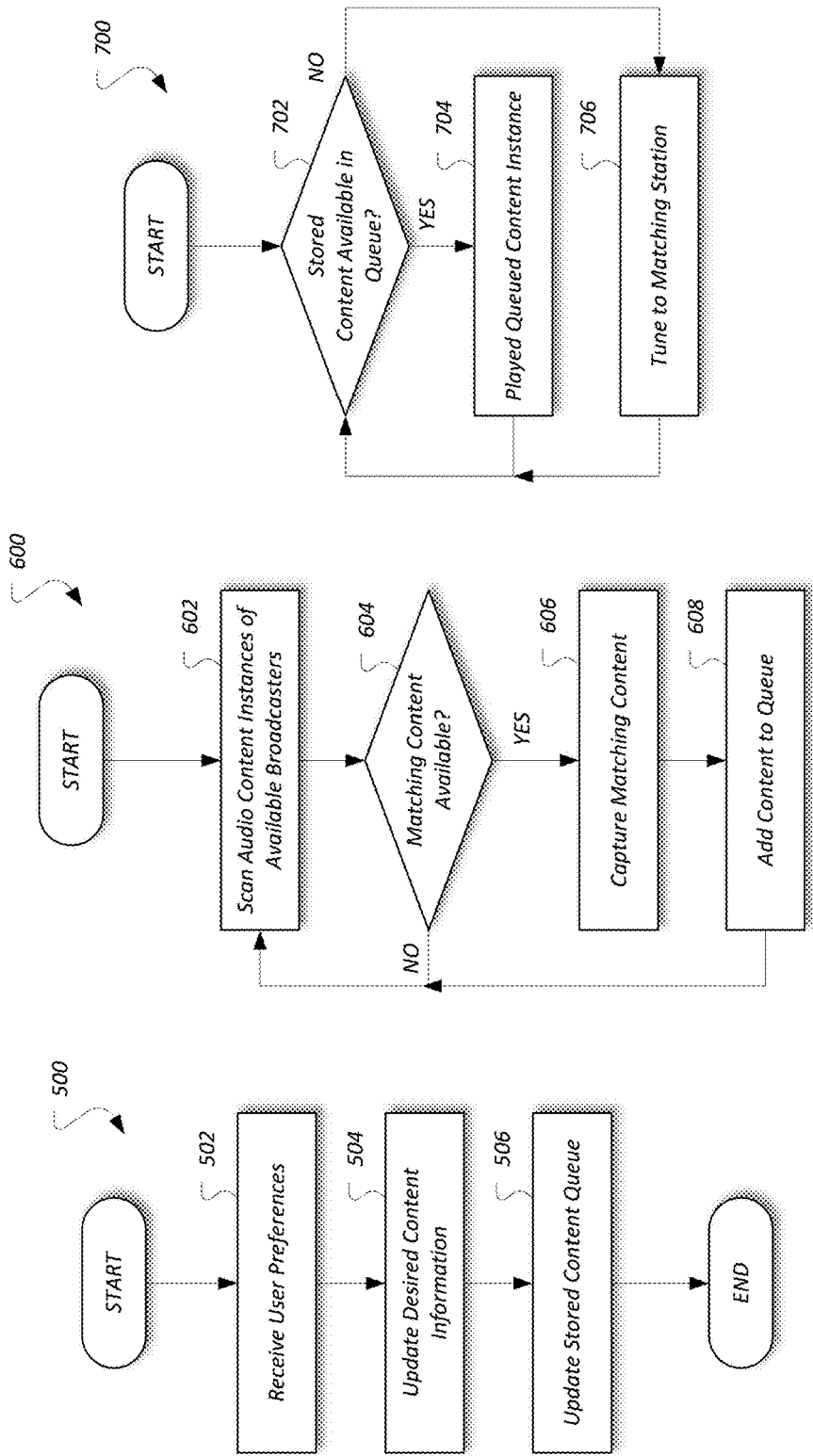
FIG. 5 illustrates an exemplary process for receiving the user content preferences.
FIG. 6 illustrates an exemplary process for recording broadcast audio content instances into a customized content queue.
FIG. 7 illustrates an exemplary process for playing back audio content instances from the customized content queue as a custom station confirming to the user content preferences.

FIG. 5 illustrates an exemplary process 500 for receiving the user content preferences 210. The process 500 may be performed, for example, by the custom station application 214 executed by the VCS 1 of the vehicle 31.

At operation 502, the custom station application 214 receives user preferences 210. For example, the custom station application 214 may receive the user preferences 210 via user entry into the user interface 300 of the custom station application 214 for receiving the user content preferences 210. As another example, the custom station application 214 may receive the user preferences 210 by way of the more-like-this control 408 or skip control 410 of the user interface 400.

At operation 504, the custom station application 214 updates the desired content information 212 based on the user content preferences 210. For example, the custom station application 214 may query the content categorization server 208 for desired content information 212 corresponding to the updated user content preferences 210. The content categorization server 208 may retrieve the requested desired content information 212 and provide them to the VCS 1 for use in matching to audio content instances 202.

At operation 506, the custom station application 214 updates the customized content queue 216 based on the desired content information 212. For example, if any audio content instances 202 are currently maintained in a customized content queue 216, the custom station application 214 may be configured to update the customized content queue 216 to remove any audio content instances 202 that may no longer match with the desired content information 212 updated according to the user content preferences 210. After operation 506, the process 500 ends.

FIG. 6 illustrates an exemplary process 600 for recording broadcast audio content instances 202 into a customized content queue 216. As with the process 500, the process 600 may be performed by the custom station application 214 executed by the VCS 1 of the vehicle 31. It should be noted that in some cases, multiple instances of the process 600 may be executed by the custom station application 214 if multiple content receivers 206 are available.

At operation 602, the custom station application 214 scans available audio content providers 204 for audio content instances 202. For example, the custom station application 214 may direct the content receivers 206 to scan the audio content providers 204 to identify the metadata of audio content instances 202 currently being played by the audio content providers 204. As one possibility, the content receivers 206 may include radio tuners configured to receive RDS data including FM broadcast metadata. As another possibility, the content receivers 206 may include satellite radio tuners configured to receive satellite radio station metadata information. As yet another possibility, the content receivers 206 may include network functionality configured to retrieve the metadata from an Internet service (e.g., a service configured to scan radio stations for the metadata of currently playing audio content instances 202).

At operation 604, the custom station application 214 determines whether the scanned audio content instances 202 match the desired content information 212 associated with the user. For example, the custom station application 214 may compare the metadata of the scanned audio content instances 202 to identify whether any currently playing audio content instances 202 match an entry of the listings of the desired content information 212. If a currently playing audio content instance 202 matches the desired content information 212, control passes to operation 606. Otherwise, control passes to operation 602

At operation 606, the custom station application 214 captures the matching audio content instance 202. For example, the custom station application 214 may be configured to direct one of the content receivers 206 to tune to and record the matching audio content instance 202. The recorded audio content instance 202 may be stored, for example, in the persistent storage 7 of the VCS 1.

At operation 608, the custom station application 214 adds the captured audio content instances 202 to the customized content queue 216. For example, the custom station application 214 may add entries for the captured audio content instances 202 to the customized content queue 216. Each entry may include information such as: an indication of the storage location of the captured audio content instance 202, and metadata such as song name, song title, date and time of capture, and audio content provider 204 (e.g., FM radio station) from which the audio content instance 202 was captured. After operation 608, control passes to operation 602.

FIG. 7 illustrates an exemplary process 700 for playing back audio content instances 202 from the customized content queue 216 as a custom station confirming to the user content preferences 210. As with the processes 500 and 600, the process 700 may be performed by the custom station application 214 executed by the VCS 1 of the vehicle 31. The process 700 may be initiated, for example, upon user selection of a command configured to cause the custom station application 214 to play back content from the customized content queue 216.

At operation 702, the custom station application 214 determines whether stored audio content instances 202 are available in the customized content queue 216 for playback. For example, the custom station application 214 may identify whether any audio content instances 202 are available in the customized content queue 216. If so, control passes to operation 704. Otherwise control passes to operation 706.

At operation 704, the custom station application 214 plays back an audio content instance 202 from the customized content queue 216. For example, the custom station application 214 may retrieve an audio content instance 202 for playback via the speaker 13 or stereo system output of the VCS 1 according to an entry of the customized content queue 216 (e.g., the oldest entry). The custom station application 214 may also provide the user interface 400 to illustrate playback of the audio content instance 202. Once played, the audio content instance 202 may be removed from the queue 216 and discarded. After operation 704, control passed to operation 702.

At operation 706, the custom station application 214 tunes to a matching audio content provider 204. For example, if no audio content instances 202 are available for playback, the custom station application 214 may default to playback of a currently playing audio content instance 202 that matches the content preferences 210. If no such audio content instance 202 is available for playback, the custom station application 214 may discontinue playback, or may simply provide live content as available from an audio content provider 204. After operation 706, control passed to operation 702.

In general, computing systems and/or devices, such as the VCS 1, may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing devices include, without limitation, a computer workstation, a server, a desktop, notebook, laptop, or handheld computer, or some other computing system and/or device.

Computing devices such as the VCS 1 generally include computer-executable instructions, where the instructions may be executable by one or more computing devices such as those listed above. In an example, the custom station application 214 may be implemented as computer-executable instructions to be executed by the processor 3 of the VCS 1. Computer-executable instructions may be compiled or interpreted from computer programs created using a variety of programming languages and/or technologies, including, without limitation, and either alone or in combination, Java™, C, C++, C#, Objective C, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer.

Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor of a vehicle configured to
scan audio content providers, using at least one receiver, to identify metadata of audio content instances currently being broadcast by the audio content providers,
query a content categorization server for desired content information according to user content preferences maintained by the vehicle,
capture audio content instances from the audio content providers, using the at least one receiver, where the metadata of the audio content instances matches the desired content information, and
add the captured audio content instances to a customized content queue of desired audio content.

2. The system of claim 1, wherein the audio content providers are radio stations, the audio content instances are songs, and the desired content information includes information indicative of metadata of the desired audio content.

3. The system of claim 1, wherein the processor is further configured to play a captured audio content instance from the customized content queue.

4. The system of claim 3, wherein the processor is further configured to provide a user interface displaying metadata of the captured audio content instance being played.

5. The system of claim 4, wherein the processor is further configured to provide, in the user interface, information regarding when and from which audio content provider the captured audio content instance being played was captured.

6. The system of claim 1, wherein the processor is further configured to receive the user content preferences via a user interface of the vehicle.

7. The system of claim 1, wherein the user content preferences include at least one of song title, artist name, type of melody, type of harmony, type of rhythm, or instrumentation used.

8. The system of claim 1, wherein the processor is further configured to receive the user content preferences from a nomadic device paired to the vehicle.

9. The system of claim 1, wherein the user content preferences include at least one of: type of melody, type of harmony, type of rhythm, or instrumentation used.

10. A method comprising:
scanning audio content providers, using a receiver, to identify metadata of audio content instances currently being broadcast;
querying a content categorization server for desired content information according to user content preferences maintained by a vehicle;
capturing audio content instances from the audio content providers where the metadata of the audio content instances matches the desired content information; and
adding the captured audio content instances to a customized content queue.

* * * * *